Nov. 22, 1949 — E. SCHWARZKOPF — 2,488,562
PIVOTED JOINT STRUCTURE
Filed Jan. 27, 1947

INVENTOR
Emil Schwarzkopf
BY John Flam
ATTORNEY

Patented Nov. 22, 1949

2,488,562

UNITED STATES PATENT OFFICE 2,488,562

PIVOTED JOINT STRUCTURE

Emil Schwarzkopf, Los Angeles, Calif.

Application January 27, 1947, Serial No. 724,533

11 Claims. (Cl. 287—96)

This invention relates to a pivoted joint; more particularly, it relates to such a joint for use in mounting artificial body members, or for other orthopedic appliances, such, for example, as braces.

This application is a continuation, in part, of an application filed in the name of Emil Schwarzkopf on September 17, 1945, under Serial No. 616,681 and entitled "Joint for artificial body members."

In said prior application a pivoted joint is shown, by way of example, as mounting an artificial limb in cases where the amputation is above the knee and near the pelvis and thus serving as a hip joint. However, the joint is adapted to serve equally well as a knee joint, or for other purposes. In this joint an anti-friction bearing is provided, using a surface on one of the joined members as an element of the bearing, and is so arranged as to be protected against entry of dust and other foreign matter, as well as to prevent loss of lubricant. Additionally, the bearing is arranged to permit disassembly and re-assembly of the joint without disturbing the rolling bearing elements.

It is an object of the present invention to provide such a joint having an improved bearing.

It is another object of this invention to provide such a joint utilizing an easily replaceable bearing structure.

It is another object of this invention to provide a rolling bearing structure for such a joint, wherein loss of lubricant and entry of dust or foreign matter is guarded against, which will permit assembly and disassembly of the joint without disturbing the bearing elements, and which may be readily removed and replaced as a unit.

This invention possesses many other advantages, and has other objects which may be made more clearly apparent from a consideration of one embodiment of the invention. For this purpose there is shown a form in the drawings accompanying and forming part of the present specification. The form will now be described in detail illustrating the general principles of the invention; but it is to be understood that this detailed description is not to be taken in a limiting sense, since the scope of this invention is best defined by the appended claims:

Figure 1:
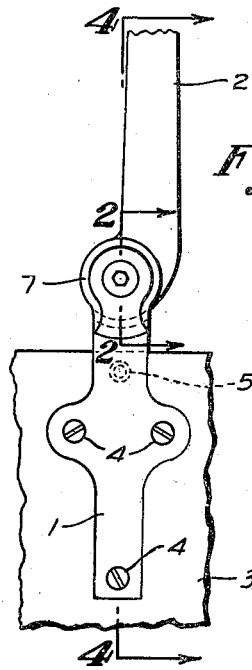
Figure 1 is a side elevation of a joint structure incorporating the invention.

Referring to Fig. 1, a joint structure is shown comprising arms 1 and 2, which are arranged to be attached to the parts to be connected by the joint. For example, if the structure is to be used as an artificial knee joint, the lower arm 1 may be arranged to be secured to the exterior surface of the upper end of an artificial limb 3 by a plurality of wood screws 4.

The arms 1 and 2 are preferably formed of some material combining suitable strength and light weight, such, for example, as aluminum, or special steels, or other well-known alloys.

Figure 4:
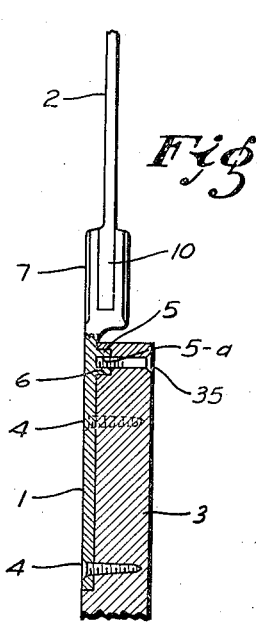
Fig. 4 is a view partly in section, taken as indicated by line 4—4 of Fig. 1.

To ensure adequate strength of the arm 1 and its attachment to the limb 3, a boss 5 is provided on the inside surface of the arm 1 near the upper end of the limb 3, and which is provided with recess 6 for accommodating the boss. This boss 5 is provided with a tapped hole 5—a, which does not extend through the arm 1, for receiving a counter-sunk head screw 35 which is inserted from the inside of the limb 3 (see Fig. 4).

Figure 2:
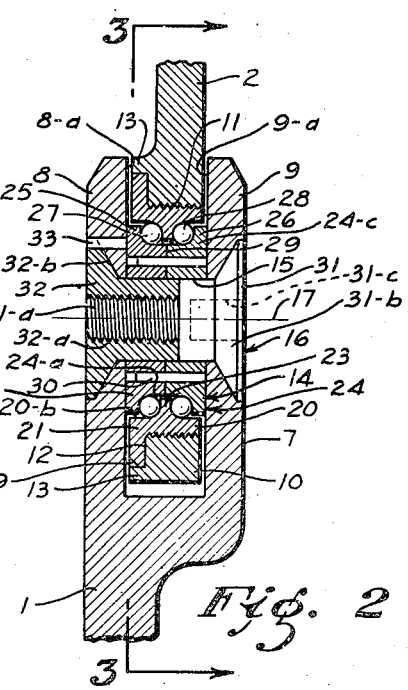
Fig. 2 is a transverse section partly in elevation, on an enlarged scale, taken substantially as indicated by line 2—2 on Fig. 1.

The upper end 7 of the arm 1, as shown in Fig. 2 is bifurcated or of clevis form to provide sections 8 and 9 which have opposing, spaced parallel plane surfaces 8—a and 9—a between which the lower end 10 of the upper arm 2 is accommodated.

As shown in Fig. 2, the end 10 of the upper arm 2 has a large threaded opening 11 with an annular shoulder 12 on one side formed by a lip or flange 13. The anti-friction bearing structure 14 is secured by being threaded in this opening 11, and has a central aperture 15 for accommodating a pivot pin or shaft 16, secured respectively in sections 8 and 9 of the lower arm 1. The arms 1 and 2 are thus connected for relative swinging movement about the axis 17 of the pin 16.

Figure 3:
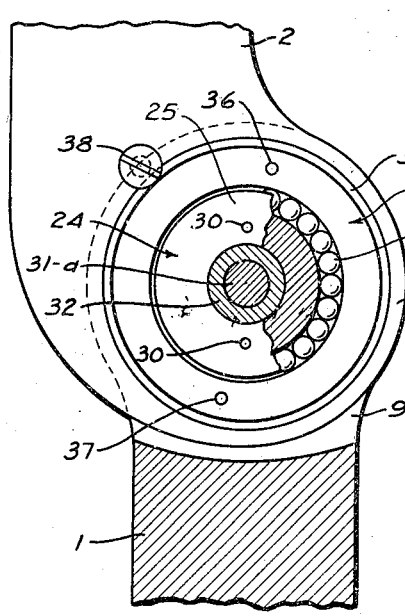
Fig. 3 is a section, partly in elevation, taken as indicated by line 3—3 on Fig. 2.

Referring in detail to the bearing structure 14, an outer race member 20 is provided, being exteriorly treaded and adapted to fit within the opening 11. This member 20 has a flange 21 accommodated on the shoulder 12 within the lip 13. The member 20 has an inner circular surface 20—b provided with a central inwardly extending wall 23. Apertures 36 and 37 may be provided in flange 21 to accommodate a spanner wrench. Furthermore, a flat head screw 38 (Fig. 3) may be threaded in a countersunk tap in arm 2 to overlie the bevelled edge 39 of flange 21. The bevel is deep enough to permit the head of screw 38 to be flush with the surface of flange 21.

The inner race member 24 (Fig. 3) has a circular channel 24—a formed by the radially outwardly extending walls 25 and 26 respectively on the outer ends of the member. The wall 23 of the outer race divides the channel 24—a into a pair of raceways for respectively accommodating the rolling bearing elements 27 and 28 which, in this case, are shown as steel balls. The described construction provides a combined radial and thrust bearing.

To enable assembly of the bearing 14, the inner member 24 is formed of two pieces, 24—b and 24—c joined along a central annular face 29 as by dowel pins 30. These pins 30 are a light drive fit, so that the bearing 14 is maintained in assembled relationship. The aperture 15 for accommodating the pin 16 extends through the member 24.

The pin 16 is formed of two threadedly connected sections 31 and 32, one of which, as 31, has a reduced threaded portion 31—a accommodated in threaded bore 32—a formed in the other section. The pin sections have conical heads 31—b and 32—b respectively accommodated in countersunk openings provided on the opposite outer sides of the bifurcated end 7. When the sections 31 and 32 are in assembled relation, they provide a cylindrical surface for engaging the wall of the aperture 15.

To facilitate assembly and disassembly of the sections 31 and 32 of the pin 16, so that the arms 1 and 2 may be disconnected and/or assembled, the section 31 may be provided with a non-circular recess 31—c adapted to receive a suitable wrench, the section 32 being restrained, as by a pin 33 engaging a notch in the head 32—b.

The inner race member 24 has a thickness substantially equal to the spacing between the clevis surfaces 8—a and 9—a, thus, by appropriate proportioning of the pin sections 31 and 32, the arms 8 and 9 of the clevis 7 may be caused to clamp the member 24 against rotation. On the other hand, the thickness of the outer race 20 and the arm end 10 is slightly less than the spacing of the surfaces 8—a and 9—a to ensure free relative angular movement between the arms 1 and 2.

However, this clearance between the outer faces of the race 20 and clevis faces 8—a and 9—a, as well as the clearance between the peripheries of the walls 25 and 26 and the inner cylindrical surfaces of the outer race 20, is such as substantially to prevent escape of lubricant with which the bearing structure 14 is assembled, as well as to prevent entry of dust, etc.

It will be apparent that the pin sections 31 and 32 may be disconnected readily, permitting disassembly of the arms 1 and 2, and further that bearing 14 may be removed from the upper arm 2 if necessary and be replaced by aid of a spanner wrench engaging the apertures 36 and 37 (Fig. 3) in the flange 21, after screw 38 is removed. In either case, the bearing elements are not disturbed, and the arms may be re-assembled readily, either with the original bearing or a replacement.

Screw 38, engaging flange 21, restrains the member 20 against rotation after the parts are in place.

The bearing member 14 can be made of appropriate tool steel or other materials capable of withstanding radial and thrust loads; yet the arms 1 and 2 can be formed of less expensive materials, although of sufficient strength to provide the necessary rigidity for the joint parts.

The inventor claims:

1. In a pivoted joint structure: a pair of arms, one of said arms having a bifurcated end for accommodating the end of the other arm; means forming an outer bearing race detachably secured in the end of said other arm; means forming an inner race; rolling bearing elements between said races; and means urging the bifurcations together for clamping said inner race forming means to said bifurcated arm.

2. In a pivoted joint structure: a pair of arms, one of said arms having a bifurcated end for accommodating the end of the other arm; means forming an outer bearing race detachably secured in the end of said other arm; means forming an inner race; and a member extending through the ends of said arms as well as through said inner race forming means for urging the bifurcations of said one arm together and thereby detachably securing said inner race forming means to said one arm.

3. In a pivoted joint structure: a pair of arms, one of said arms having a bifurcated end with spaced parallel surfaces between which the end of the other arm is accommodated; an outer bearing race having parallel faces closely accommodated between said surfaces but having clearance for relative movement; an inner bearing race having parallel outer faces clamped between said surfaces; and rolling bearing elements between said races.

4. In a pivoted joint structure: a pair of arms, one of said arms having a bifurcated end with spaced parallel surfaces between which the end of the other arm is accommodated; an outer bearing race having parallel faces closely accommodated between said surfaces but having clearance for relative movement; an inner bearing race having parallel outer faces between said surfaces; and a threaded member extending through said inner race and said bifurcated end for clamping said inner race to said end.

5. In a hinge structure: an arm; a bearing structure comprising an inner and outer race together with bearing elements therebetween; said outer race adapted to be received and detachably scured to an extension of said arm; a second arm having bifurcations embracing said bearing structure and the extension of said first arm; and means joining the said second arm to said inner race; said second arm being out of contact with said first arm.

6. In a hinge device: a bifurcated arm; a second arm; a bearing structure unit adapted to be detachably mounted on and substantially within an extension of said second arm; said bearing structure comprising inner and outer races together with rolling bearing elements therebetween; the second arm together with said bearing structure being received between the bifurcations of said arm; and means securing said bifurcated arm to said inner race, the said bifurcated arm being out of contact with said second arm.

7. In a device of the character described: an arm having an aperture in one end thereof; a bearing structure adapted to be positioned and secured in said apertured arm as a unit; said structure comprising inner and outer races together with rolling bearing elements therebetween; said inner race being provided with an axially extending through opening; a second arm having bifurcations embracing the end of the first arm; and means joining the said second arm to said inner race; said second arm being out of contact with said first arm.

8. In a device of the character described: an inner race; an outer race; rolling elements between said races; means forming a recess in which the outer race is detachably secured; a bifurcated member embracing said means and outer race, the distance between the bifurcations of the member being greater than the width of the assembled outer race and said means; said inner race extending between the bifurcations; and means securing the inner race to the bifurcations.

9. In a hinge structure: a first arm having a bifurcation; a second arm having a portion extending between the bifurcations; a bearing structure detachably mounted on said portion and including rolling elements and inner and outer races, said races being so formed that they may be removed from and replaced into said portion as a unit; and means for attaching the bifurcations to the inner races.

10. In a hinge structure: a first arm having a bifurcation; a second arm having a portion extending between the bifurcations; a bearing structure detachably mounted on said portion and including rolling elements and inner and outer races, one of said races being split along a plane transverse to the axis of the bearing and including means detachably holding the split parts together, the rolling elements serving to restrain the races against disassembly; and means for attaching the bifurcations to the inner race.

11. In a hinge structure: a first arm having a bifurcated end; a second arm having an end received between the bifurcations; an outer race having an exterior threaded surface engaging said end; said outer race having an intermediate flange for defining a pair of spaced ball race surfaces; an inner race having two portions detachably secured together, each portion providing an inner race surface cooperating respectively with the outer ball race surfaces; ball bearings in the respective races; and means for fastening the inner race to the bifurcations, comprising a pair of threadedly engaging members having heads engaging the bifurcations and passing into the inner race.

EMIL SCHWARZKOPF.

REFERENCES CITED

The following references are of record in the file of this patent:

UNITED STATES PATENTS

| Number | Name | Date |
| --- | --- | --- |
| 1,008,048 | Mueller | Nov. 7, 1911 |

FOREIGN PATENTS

| Number | Country | Date |
| --- | --- | --- |
| 508,556 | France | Oct. 15, 1920 |